United States Patent [19]

Berry et al.

[11] Patent Number: 5,311,302
[45] Date of Patent: May 10, 1994

[54] ENTERTAINMENT AND DATA MANAGEMENT SYSTEM FOR PASSENGER VEHICLE INCLUDING INDIVIDUAL SEAT INTERACTIVE VIDEO TERMINALS

[75] Inventors: Dickey J. Berry, La Verne; Richard A. Bertagna, San Dimas, both of Calif.

[73] Assignee: Hughes Aircraft Company, Los Angeles, Calif.

[21] Appl. No.: 908,095

[22] Filed: Jul. 2, 1992

[51] Int. Cl.$^5$ .................... H04N 7/14; H04M 11/00
[52] U.S. Cl. ............................ 348/14; 379/90; 379/96
[58] Field of Search ............... 379/93, 90, 91, 96; 358/85, 86, 84, 254; 340/712; 364/188

[56] References Cited

U.S. PATENT DOCUMENTS

| | | | |
|---|---|---|---|
| 4,584,603 | 4/1986 | Harrison | 358/86 |
| 4,647,980 | 3/1987 | Steventon et al. | 358/86 |
| 4,725,694 | 2/1988 | Auer et al. | 340/712 |
| 4,731,818 | 3/1988 | Clark, Jr. et al. | 379/91 |
| 4,887,152 | 12/1989 | Matsuzaki et al. | 358/86 |
| 4,947,244 | 8/1990 | Fenwick et al. | 358/86 |
| 5,003,505 | 3/1991 | McClelland | 364/900 |
| 5,086,385 | 2/1992 | Launey et al. | 364/188 |
| 5,177,616 | 1/1993 | Riday | 358/254 |

FOREIGN PATENT DOCUMENTS

| | | | |
|---|---|---|---|
| 0277014 | 1/1988 | European Pat. Off. | H04N 7/18 |
| 0326751 | 11/1988 | European Pat. Off. | G06K 11/06 |
| 0436472 | 1/1990 | European Pat. Off. | H04N 7/16 |
| WO9007847 | 12/1989 | PCT Int'l Appl. | H04N 7/173 |
| WO91/06160 | 10/1990 | PCT Int'l Appl. | H04H 1/02 |

*Primary Examiner*—Curtis Kuntz
*Assistant Examiner*—Jason Chan
*Attorney, Agent, or Firm*—Elizabeth E. Leitereg; Terje Gudmestad; W. K. Denson-Low

[57] ABSTRACT

A video monitor or terminal (14,80) is provided in front of each passenger seat in an aircraft or other vehicle. Each terminal (14,80) includes a video display screen (22) which may be mounted in a seatback (16) or bulkhead facing the respective seat, or at the end of a pivotable swing arm (92) extending from the armrest console (84) of the seat. A transparent touch panel (24) overlies the screen (22) and has a plurality of touch sensitive areas for generating discrete electrical selection signals when touched. A computing unit including a text generator (30) displays visual prompts corresponding to passenger-selectable operations on the screen (22) underlying predetermined pressure sensitive areas of the touch panel (24). The operations may include selection of a multiplexed video channel for viewing, control of an individual video tape player (86), ordering of food, drinks and catalog merchandise and placing of telephone calls. A credit card reader (36) may be provided for payment for ordered items. An electronic control unit (28,94) is responsive to the selection signals from the panel (22), and controls the video terminal (14,80) to perform the operations corresponding thereto.

17 Claims, 5 Drawing Sheets

ENTERTAINMENT AND DATA MANAGEMENT SYSTEM FOR PASSENGER VEHICLE INCLUDING INDIVIDUAL SEAT INTERACTIVE VIDEO TERMINALS

BACKGROUND OF THE INVENTION

1. Field of the Invention

The present invention generally relates to video entertainment and data management systems for passenger vehicles such as aircraft, and more specifically to a system including individual video terminals provided at passenger seats for display of video programs and interactive system control.

2. Description of the Related Art

Commercial airline companies are constantly striving to provide improved services for their customers. Inflight movies projected on a screen which is visible to all of the passengers in a particular section of an aircraft cabin are standard in the industry. However, the movies to be shown on each flight are selected by the airline company, and may not appeal to all of the passengers.

It is therefore desirable to provide each passenger with an individual means for viewing a movie of his or her choice. This capability is made possible by the development of small, flat-screen video monitors or terminals which can be provided at each passenger seat. The passengers may select the movies they wish to watch from a number of movies being supplied simultaneously over a multiplexed video cable system. The terminals may also include video tape players (VTRs) which enable the passengers to select the movies they wish to watch from a library of video tapes available in the aircraft.

Various configurations of personal video monitors and players have been proposed as illustrated in an advertisement by the Airvision company in Air Transport World magazine, April 1990, page 99. These include monitors mounted in seatbacks, and on trays which fold down from the seatbacks. For front row seats with no seatbacks in front of them, the monitors may be rigidly mounted on the armrests or consoles between the seats. Monitors may also be attached to the ends of telescoping arms which extend upwardly from consoles or armrests.

The volume level, channel selection, tape play/stop and other rudimentary functions of these conventional video monitors and tape players are controlled by simple membrane switches located in the seat armrest console. This arrangement is inconvenient in that the control switches are located in a position remote from the monitors, and the passengers must locate the switches and manipulate them by feel while viewing the screen.

The conventional arrangement is also disadvantageous to construct since connecting cables must be provided between the control switches and monitors. This is especially problematic in an installation in which the monitors are mounted in the seatbacks of the forward seats, since the cables must extend between the seat in which the switches are provided and the forward seats.

Passenger services such as food and drink orders, on-board and mail-order sales, placing of telephone calls, etc. are conventionally provided manually by flight attendants. This is inefficient since the flight attendant must first go to each individual passenger seat to verbally determine the item or service the passenger requires, and then go to the passenger seats again to provide the item or service. In addition, payment for requested items, especially involving conversion between foreign currencies or the use of credit cards, is inefficient and time consuming.

SUMMARY OF THE INVENTION

In an interactive video entertainment and data management system embodying the present invention, a video terminal is provided in front of each passenger seat in an aircraft or other vehicle. Each terminal includes a video display screen which may be mounted in a seatback or bulkhead facing the respective seat, or at the end of a pivotable swing arm extending from the armrest console of the seat.

A transparent touch panel overlies the screen and has a plurality of touch sensitive areas for generating discrete electrical selection signals when touched. A computing unit including a character generator displays visual prompts corresponding to passenger-selectable operations on the screen underlying predetermined pressure sensitive areas of the touch panel.

The operations may include selection of a multiplexed video channel for viewing, control of an individual video tape player, ordering of food, drinks and catalog merchandise and placing of telephone calls. Food and drink requests are displayed on a central terminal at the flight attendant's station. A credit card reader may be provided for automated payment for ordered items. An electronic control unit is responsive to the selection signals from the panel, and controls the video terminal to perform the operations corresponding thereto.

The present arrangement is advantageous in that the control switches are provided on the video terminal or monitor itself, and very easy to manipulate compared to the prior art. No connecting cables between remote switches and monitors are required.

Interactive ordering of food, drinks and on-board sales items greatly increases the cabin management efficiency since the flight attendants do not have to go to the passenger seats to obtain requests verbally. Ordering of catalog items, payments by credit card and placing of telephone calls are entirely free of flight attendant participation.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
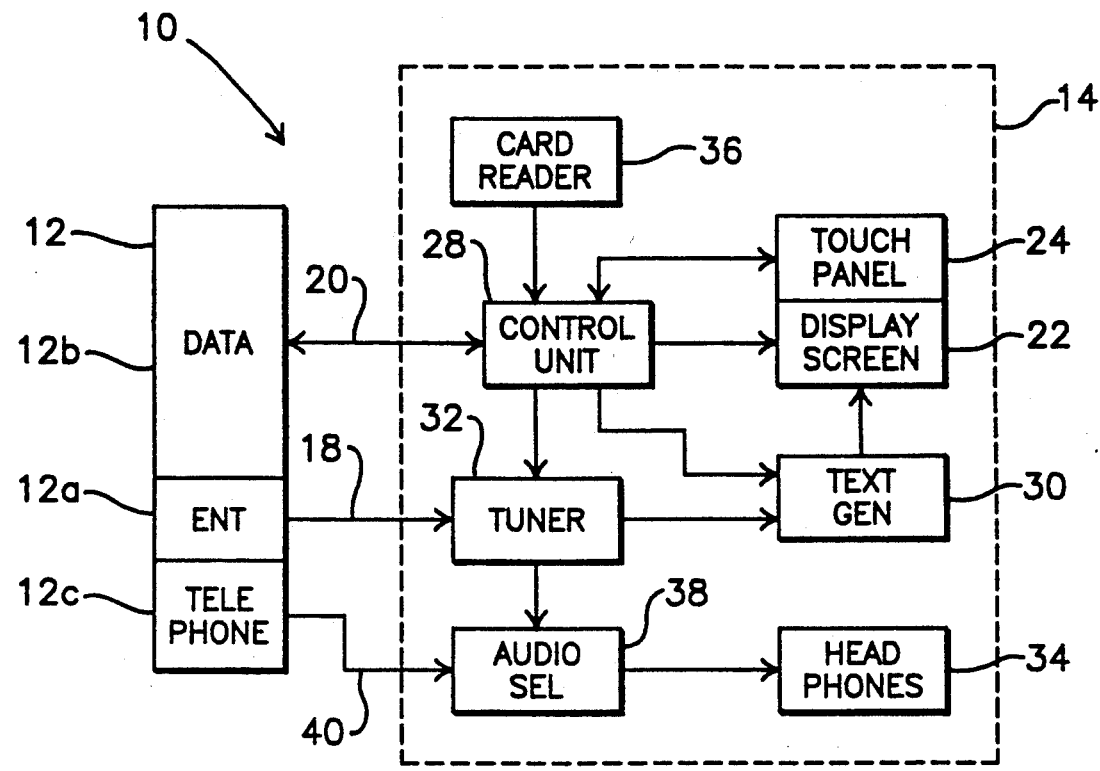
FIG. 1 is a simplified block diagram of a first embodiment of an interactive video entertainment and data management system of the present invention including individual interactive seat video terminals.
Figure 2:
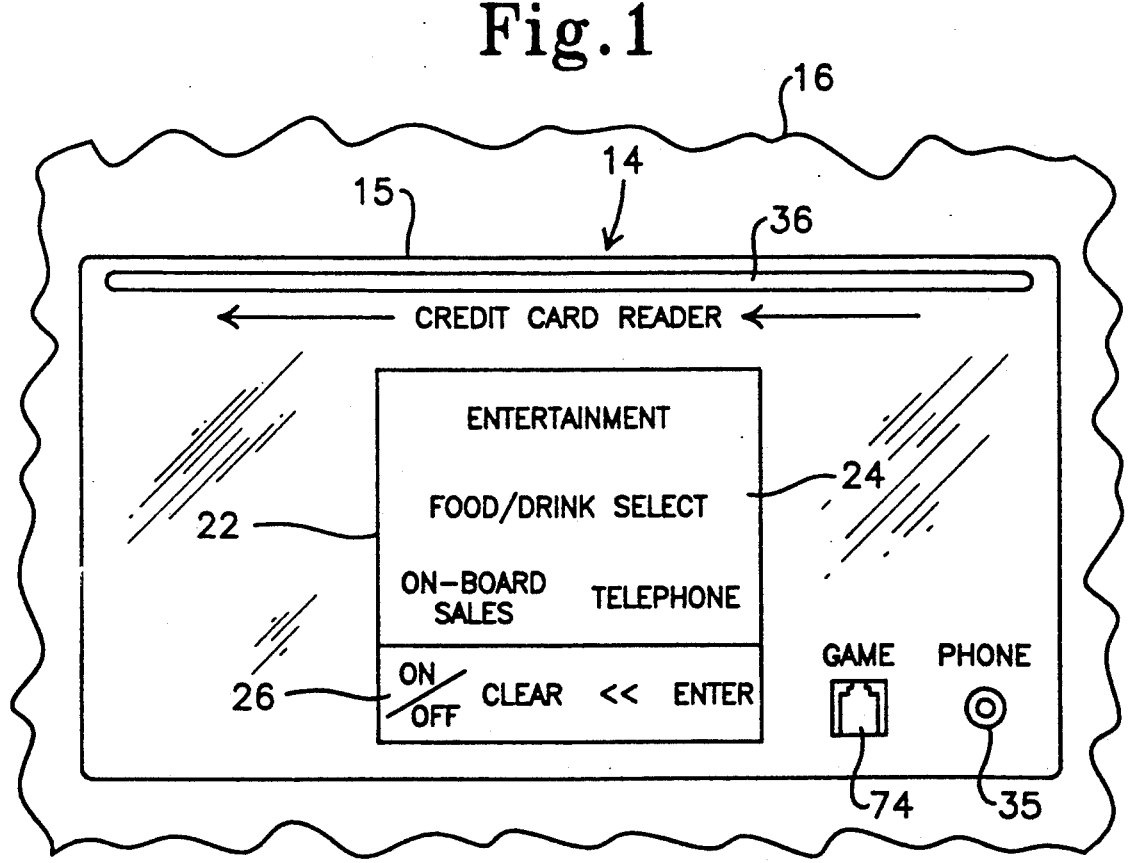
FIG. 2 is a front elevational view of a terminal of the system of FIG. 1.
Figure 3:
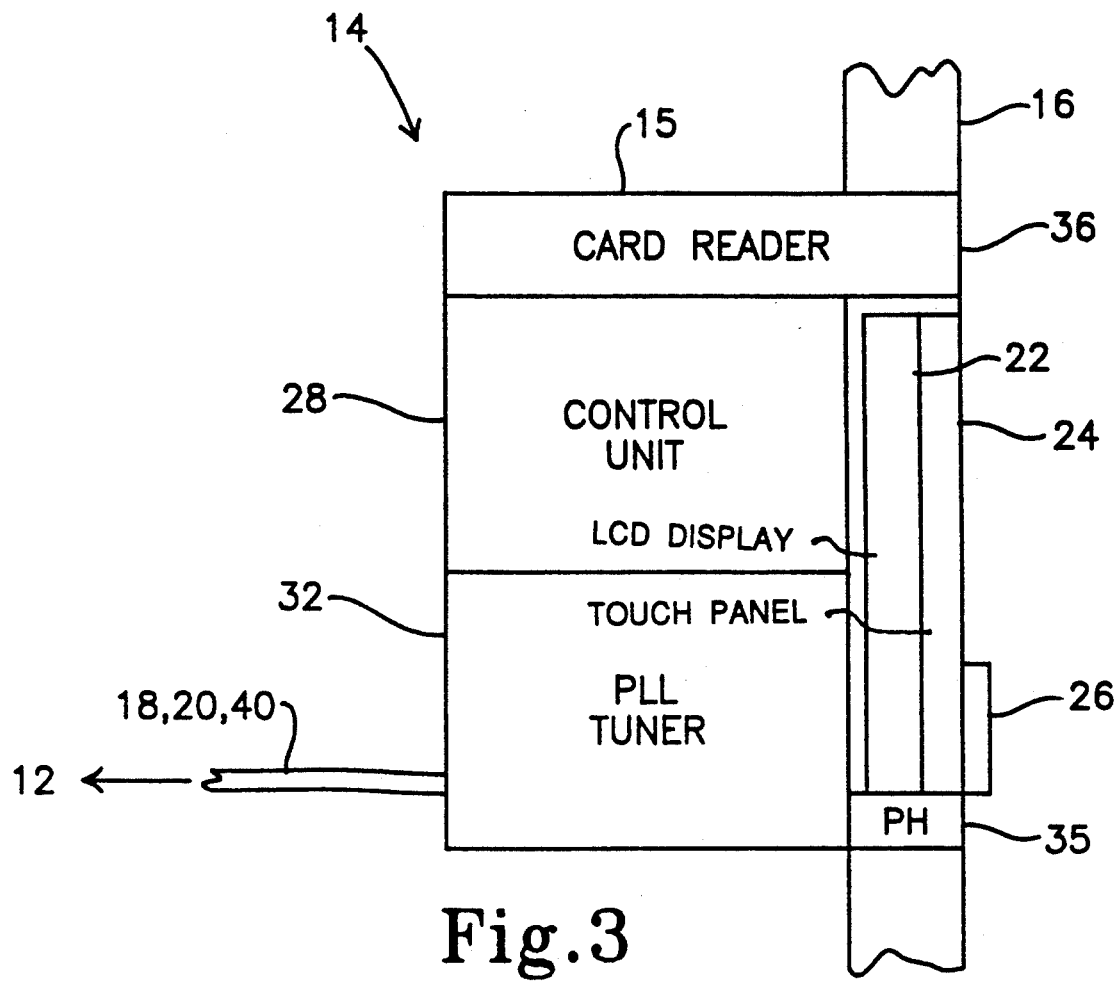
FIG. 3 is a simplified side elevational view illustrating an exemplary layout of components in the terminal of FIG. 2.

Referring to FIGS. 1 to 3 of the drawing, an interactive video entertainment and data management system for a passenger vehicle such as an aircraft is generally designated as 10, and includes a central terminal 12 and a plurality of remote video terminals 14. Although only one terminal 14 is illustrated, a plurality of terminals 14 are provided in the system 10, with one terminal 14 being mounted forward of each passenger seat. As shown in FIG. 2, the illustrated terminal 14 includes a housing 15 mounted in a seatback 16 so as to be comfortably viewable by a passenger in the seat immediately behind the seatback 16. For front row seats, the terminal 14 is mounted in a bulkhead forward of the seat.

The central terminal 12 includes an entertainment section 12a for generating a multiplexed video/audio signal including a plurality of movie channels. Although not specifically illustrated, the section 12a typically includes a plurality of VTRs for playing different movies respectively and a multiplexer for multiplexing the channels and feeding the resulting signal to the terminals 14 via a line 18. The central terminal 12 also includes a data section 12b for polling the terminals 14 for data, and receiving the data therefrom over a line 20. The central terminal 12 may further include a radiotelephone transceiver unit 12c for enabling passengers to place overseas telephone calls from the aircraft.

The details of the central terminal 12 and lines 18 and 20 per se are not the particular subject matter of the present invention. A central terminal and interconnecting lines suitable for practicing the invention are commercially available from Hughes-Avicom International (HAI) of Glendora, Calif. Although not illustrated in detail, the data section 12b generally includes a mainframe class computer capable of multi-user, multi-tasking operation and downloading of data received from the terminals 14 to an external facility for processing. The data section 12b communicates with the terminals 14 using a local area network (LAN) such as the Ampro "Arcnet" system. In this case, the line 20 is constituted by a twisted conductor pair, and the individual seat terminals 14 are sequentially polled for data from the central terminal 12 using a "token ring" communications protocol.

Each remote terminal 14 includes a video display screen 22 such as a flat liquid crystal display (LCD) panel. A commercially available display screen 22 suitable for application in the present system is the Sharp TFT-LCD module no. LQ4NC01. A transparent touch panel 24 is mounted closely adjacent to and overlying the screen 22 as illustrated in FIG. 3.

Figure 4:
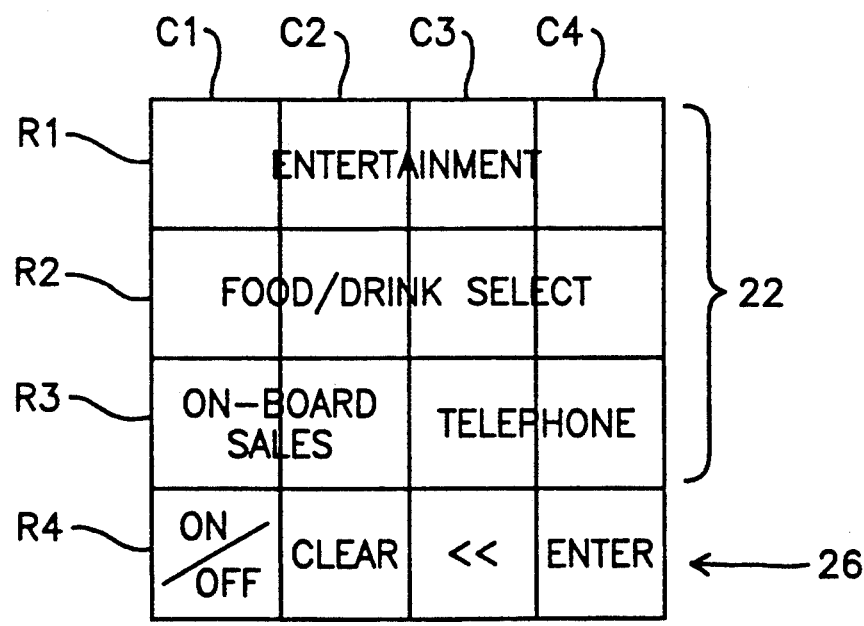
FIG. 4 is a diagram illustrating the layout of a touch panel of the terminal of FIG. 2.

The touch panel 24 has a plurality of touch sensitive areas which produce discrete electrical selection signals when touched. A suitable touch panel 24 which is commercially available from Transparent Devices, Inc. of Westlake Village, Calif. has, as illustrated in FIG. 4, 16 touch sensitive areas arranged in rows R1 to R4 and columns C1 to C4. Each touch sensitive area is designated by a row and column coordinate.

As illustrated in FIG. 1, each terminal 14 includes an electronic control unit 28 which controls a text generator 30 to generate and display the visual prompts on the screen 22. It will be noted that the text generator 30 may be replaced within the scope of the invention by a character generator which generates visual prompts in the form of icons or the like, although not specifically illustrated. A commercially available text generator 30 suitable for use in the system 10 is the Fujitsu Display Controller LSI no. MB88324A.

The multiplexed video/audio movie channel signal is received over the line 18 by a tuner 32, which tunes to a selected channel, feeds the channel video signal to the screen 22 via the text generator 30 and feeds the channel audio signal to a headphone 34 via a jack 35. The channel to be viewed is selected by the passenger using the touch panel 24. The selection signals are read from the panel 24 by the control unit 28, and applied to control the tuner 32 to tune to the selected channel. The tuner 32 may preferably include a Motorola PLL Tuning Circuit with 1.3 GHz Prescaler no. MC4485002, which controls a voltage controlled oscillator (VCO) in a local oscillator circuit (not shown) of the tuner 32 in response to digital signals from the control unit 28.

Each terminal 14 may further include a credit card reader 36 to enable passengers to pay for ordered or requested items using credit cards. A card reader which is suitable for use in the system 10 is commercially available from Magtek of Carson, Calif. as the Magtek Card Reader MT-211.

The control unit 28 preferably includes a microcomputer (not shown) such as the Dallas Semiconductor Soft Microcontroller no. DS5000, which uses the 8051 instruction set. The DS5000 includes a central processing unit, random access memory (RAM), input/output (I/O) ports, a software download capability and numerous additional features in a single package. During power-up of the system 10, the software program required to control the terminals 14 is downloaded from the central terminal 12 into the program RAM of the DS5000 in each terminal 14.

FIGS. 2 and 4 illustrate exemplary visual prompts of a multi-level menu system displayed on the screen 22 underlying predetermined touch sensitive areas of the panel 24. The prompt "ENTERTAINMENT" underlies row R1, columns C1 to C4. The prompt "FOOD/DRINK SELECT" underlies row R2, columns C1 to C4. The prompt "ON-BOARD SALES" underlies row R3, columns C1 and C2 whereas the prompt "TELEPHONE" underlies row R3, columns C3 and C4.

The screen 22 underlies rows R1 to R3 of the panel 24, with the prompts in these areas being displayed on the screen 22. A mask 26 is fixed overlying row R4 of the panel 24. The prompts "ON/OFF", "CLEAR", "<<(backspace)" and "ENTER" are printed on the mask 26 overlying columns C1, C2, C3 and C4 of row R4 respectively.

The control unit 28, under control of the software program, feeds digital codes to the text generator 30, which generates text or icon characters constituting the visual prompts and feeds them to the screen 22 in the proper video format for display. The text generator 30 is controllable by the control unit 28 to display only a video movie from the tuner 32, only text, or text superimposed on a video movie on the screen 22 depending on the selected control function. The software program further includes a loop which continuously scans the touch panel 24 and card reader 36, and controls the terminal 14 to perform operations in response to the selection signals generated upon touching of corresponding touch sensitive areas of the panel 24 by the passenger.

An example of a multi-level menu structure provided by the software in the control unit 28 for display of prompts on the screen will now be described. If the screen 22 is initially turned off, touching any area on the panel 24 will cause the screen 22 to be turned on and display the main menu illustrated in FIGS. 2 and 4.

Touching any column in row R1 of the panel 24 will cause the main menu to be replaced by progressively lower level menus which enable selection of a movie channel or a language. The control unit 28 controls the tuner 32 to tune to the selected video channel and audio subcarrier in accordance with the selection signals from the panel 24.

Food and drinks may be ordered or requested by touching any column in row R2, which will cause display of progressively lower level menus including lists of selections. Where the requested item is an alcoholic beverage or other item which requires payment, the lower level menus will include prompts which enable selection of the type of payment method and currency. For payment by credit card, a prompt will be displayed to instruct the passenger to swipe a credit card through the reader 36. Data corresponding to the requested food or drink is generated and transmitted by the control unit 28 to the central terminal 12, and displayed on a monitor (not shown) for servicing by the flight attendants.

Touching of column C1 or C2 of row R3 causes lower level menus to be displayed which enable selection of on-board or mail-order items for purchase. Typically, a pamphlet will be provided to each passenger listing the items for sale by numbers. Lower level menus enable input of the numbers corresponding to selected items, method of payment and, for mail-order items, the shipping address.

A cluster of numbers, letters etc. may be displayed in one touch sensitive area in a low level menu. Touching the area will cause display of a lower level menu in which each number is displayed in a separate touch sensitive area. For example, the low level menu may display a cluster including the characters "ABCDEFG" in one area, whereas touching the area causes the cluster to be exploded such that each character "A,B,C,D,E,F,G" is displayed in a separate respective touch sensitive area in the lower level menu. This enables a large number of characters to be input using a small number of touch sensitive areas.

An outgoing telephone call can be placed by touching column C3 or C4 in row R3. Lower level menus including prompts for the telephone number and payment method will be progressively displayed, in addition to prompts indicating the status of the call. The headphones 34 include a microphone as well as speakers to enable telephone communications. Each terminal 14 further includes an audio selector 38 which is controlled by the control unit 28 to connect the headphones 34 to the telephone unit 12c through a telephone cable 40 when the telephone function is selected.

Figure 5:
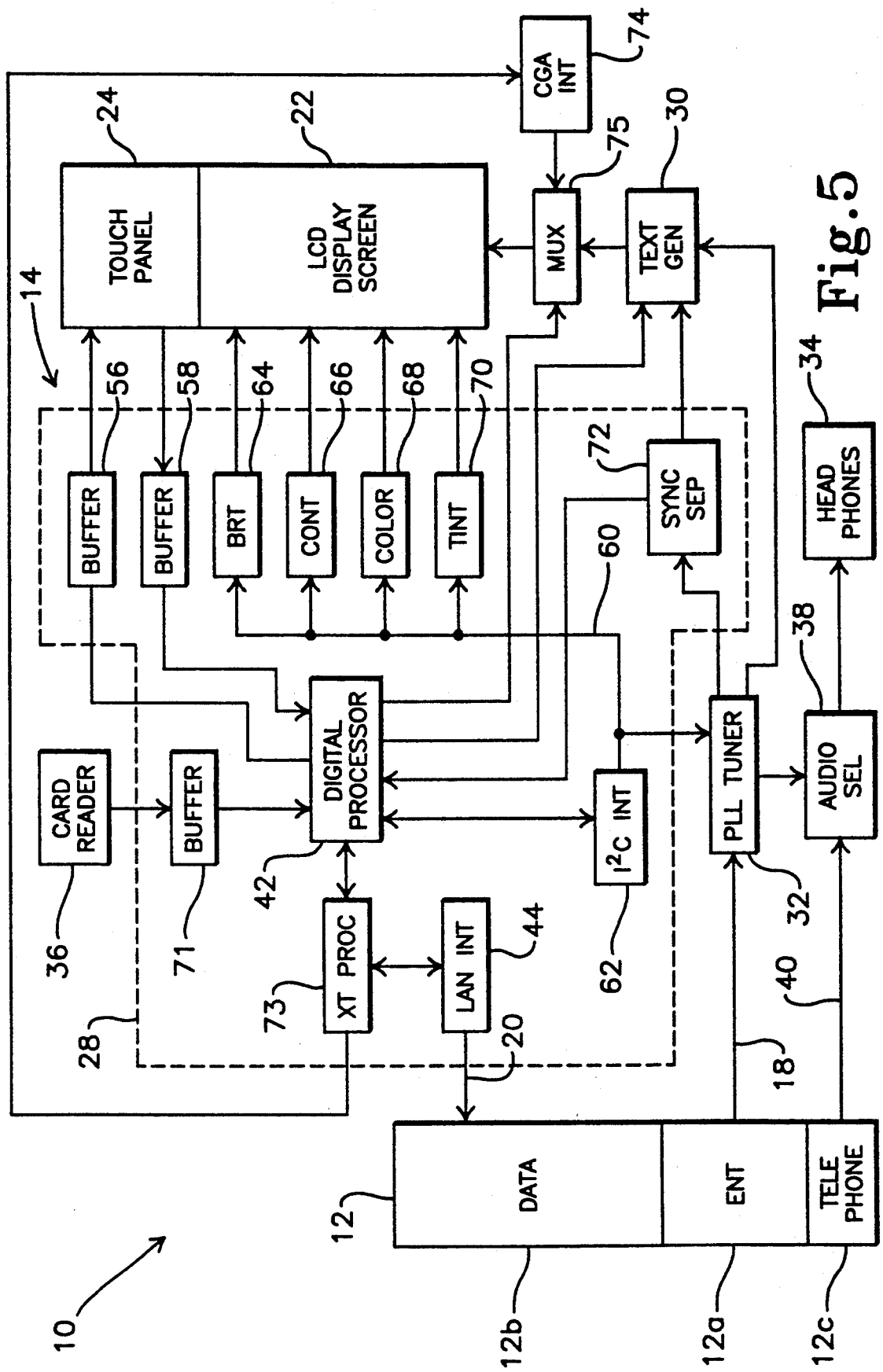
FIG. 5 is a more detailed block diagram of the system of FIG. 1.

The terminal 14 is illustrated in more detail in FIG. 5, and includes a digital processor 42 which is preferably embodied by the Dallas DS5000 Soft Microcontroller described above. The processor 42 communicates with the data section 12b of the central terminal 12 over the line 20 via an Arcnet LAN interface unit 44. The terminals 14 are operated as slave units and are sequentially polled from the central terminal 12 using the Arcnet token ring protocol.

Although not specifically illustrated, the menu system also enables selection of "BRIGHTNESS", "CONTRAST", "COLOR", "VOLUME" and "HEADSET BALANCE" prompts for adjustment of the corresponding display and sound attributes. When one of these prompts is displayed, touching an up or down arrow prompt displayed on the screen 22 causes the displayed attribute to be varied in the respective direction. The display tint can be adjusted in a similar manner.

Although not shown in detail, the touch panel 24 includes four enable lines and four read lines which are connected to the processor 42 through buffers 56 and 58 respectively. The processor 42 controls the tuner 32 via a serial $I^2C$ bus 60, and is interfaced to the bus 60 by an $I^2C$ interface 62 such as the Philips $I^2C$-Bus Controller no. PCD8584. The processor 42 also controls the brightness, contrast, color and tint of the display on the screen 22 over the $I^2C$ bus 60 via digital-to-analog converters (DACs) 64, 66, 68 and 70 respectively. Eight of these DACs are commercially available in a single package as the Philips Octuple 6-bit DAC with $I^2C$ bus no. TDA8444. The card reader 36 is connected to the processor 42 by a buffer 71.

The terminal 14 further includes a synchronization separator 72 which is preferably embodied by the National Semiconductor Video Sync Separator no. LM1881. The tuner 32 has a synchronization signal output which is connected to the separator 72. Then a video signal is output from the tuner 32, the separator 72 generates and feeds vertical and horizontal synchronization (sync) pulses to the text generator 30 for superposition of text prompts on a movie, and feeds vertical sync pulses to the processor 42.

The presence of vertical sync pulses indicates to the processor 42 that a video signal is present. In response, the processor 42 controls the text generator 30 to utilize the sync signals from the separator 72. When a video signal is not present, such as while text prompts are being displayed on the screen 22 for ordering food, drinks, etc., the processor 42 does not receive vertical sync pulses from the separator 72, and controls the text generator 30 to generate sync pulses internally for display of the text prompts.

The terminal 14 may provide additional functions such as displaying a video game which can be played using a remote module such as the Nintendo Super NES (not shown). A connector 74 is illustrated in FIG. 2 which enables the game module to be connected to the terminal 14 by a modular telephone cable or the like. The terminal 14 may also display movie previews, weather maps, flight status, connecting flight and other information generated by the central terminal 12.

The terminal 14 also preferably includes an auxiliary processor 73 as embodied by the Ampro CoreModule Xt Processor Board. The processor 73 provides an intelligent interface between the interface unit 44 and the processor 42, and includes 256K bytes of non-volatile memory for the storage of system programs, credit card sales information and other data.

The processor 73 also enables video display of weather maps, airport diagrams and other computer-generated color graphics images. A color graphics adaptor (CGA) interface unit 74 as embodied by the Ampro MiniModule CGA Board converts data from the processor 73 into CGA composite video. A multiplexer 75 is controlled by the processor 42 to select either the video from the text generator 30 or the CGA video from the interface 74 for display on the screen 22.

Figure 6:
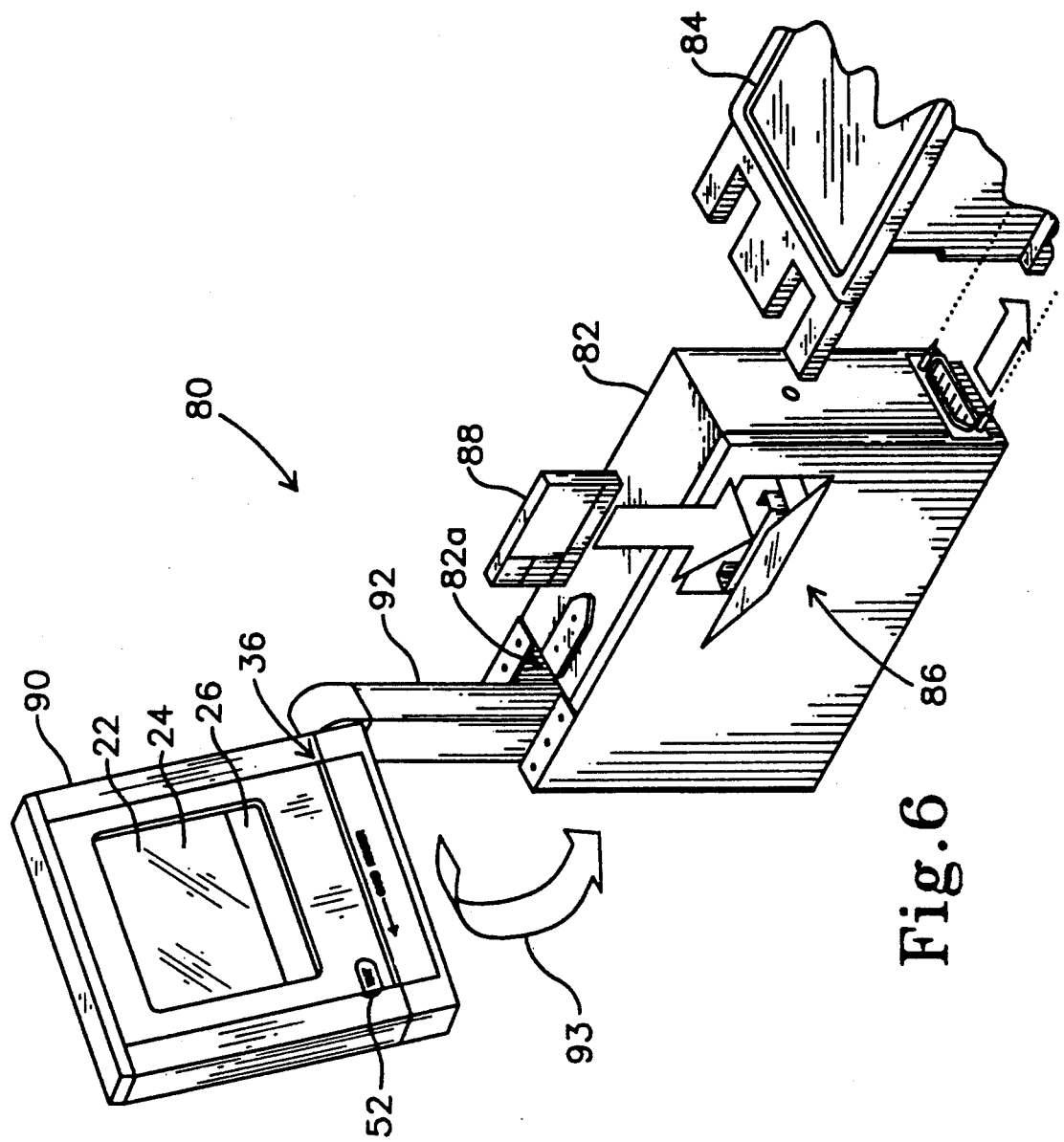
FIG. 6 is a perspective view of a terminal of a second embodiment of an interactive video entertainment and data management system of the present invention.
Figure 7:
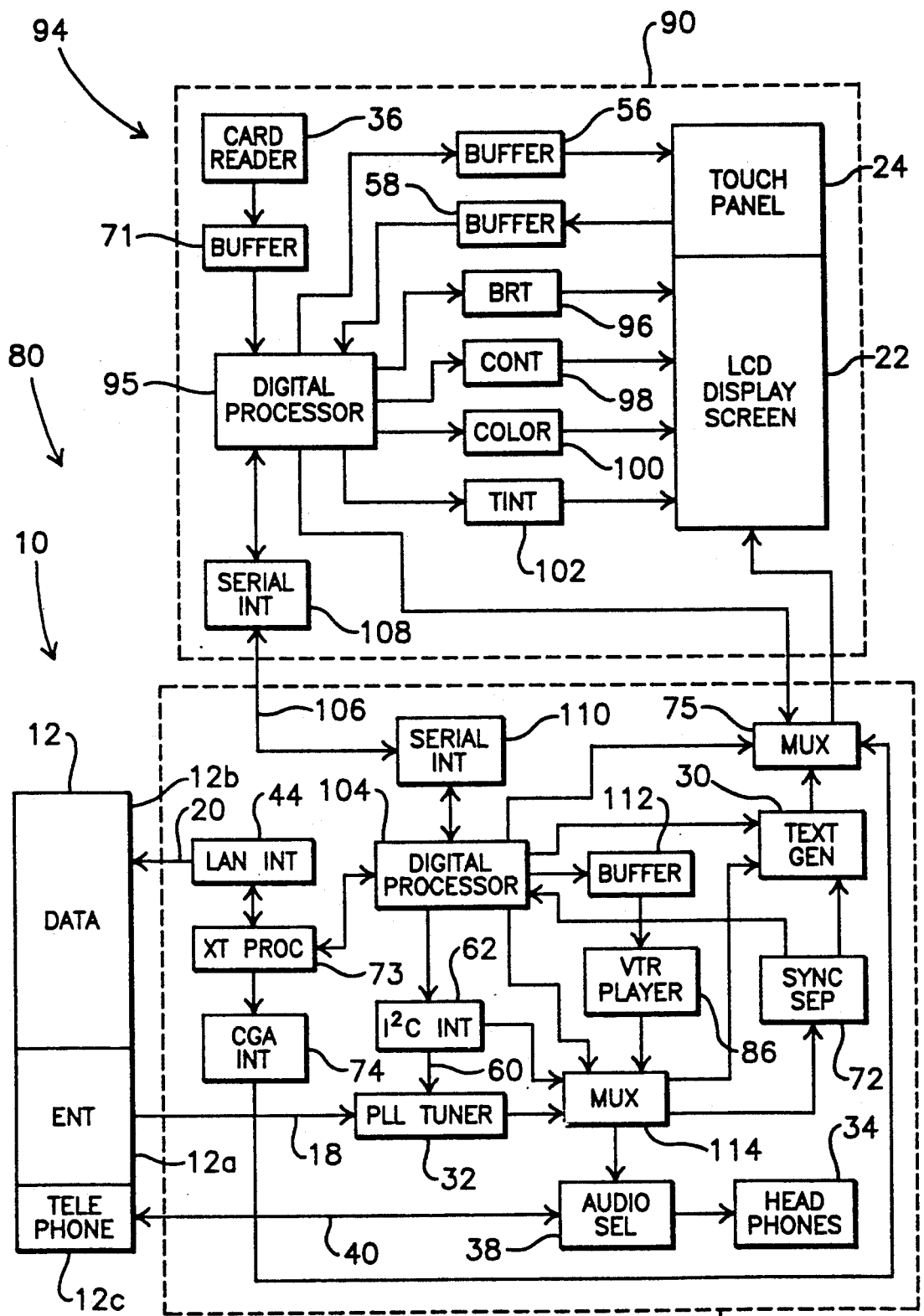
FIG. 7 is a block diagram of the system of FIG. 6.

Passenger aircraft often have first class sections which provide enhanced services above those of coach, business class, etc. In such an aircraft, the terminals 14 may be provided in the lower class sections, and terminals 80 illustrated in FIGS. 6 and 7 provided in the first class section. Each terminal 80 includes a fixed housing 82 which is detachably mounted in an armrest console 84 of a first-class passenger seat. A personal VTR player 86 is provided in the fixed housing 82 for playing of a movie recorded on a video cassette tape 88 from a library available on the aircraft. It will be understood that a player which reproduces entertainment recorded on other video storage media such as video discs, may be substituted for the VTR player within the scope of the invention.

A movable housing 90 is supported at the end of a pivotable swing arm 92, and is movable from a viewing position as illustrated in the direction of an arrow 93 to a stowed position inside a cavity 82a of the housing 82. The terminal 80 further includes elements which are common to the terminal 14, and are designated by the same reference numerals. As viewed in FIG. 6, the display screen 22 is retained in the movable housing 90, with the touch panel 24 overlying the screen 22. The magnetic card reader 36 is located below the screen 22 and panel 24. The mechanical details of the terminal 80 are disclosed in copending U.S. patent application Ser. No. 07/686,076, filed Apr. 16, 1991, entitled "PERSONAL VIDEO PLAYER AND MONITOR ASSEMBLY FOR AIRLINE PASSENGER SEAT CONSOLE", by Lani R. Lain.

As viewed in FIG. 7, a control unit 94 includes a first digital processor 95, preferably a Dallas DS5000, which is retained in the movable housing 90 and programmed to poll the touch panel 24 and card reader 36 for inputs, and to control the display attributes of the screen 22. Rather than using the I²C bus 60, the processor 95 controls the brightness, contrast, color and tint of the screen 22 via digital potentiometers 96, 98, 100 and 102 respectively which are preferably embodied by the Xicor E² POT no. X9104.

The processor 95 communicates with a similar processor 104 provided in the fixed housing 82 via a serial communication line 106 which extends from the movable housing 90 through the swing arm 92 to the fixed housing 82. Serial interfaces 108 and 110 are provided to interface the processors 95 and 104 respectively to the line 106. The processor 95 operates in slave mode, and is periodically polled by the processor 104 for data read from the touch panel 24 and card reader 36 and stored in RAM in the processor 95. The processor 104 operates as a slave unit to the data section 12b of the central terminal 12 in the manner described above relating to the processor 42.

The processor 104 controls the VTR 86 through a buffer 112. The terminal 80 further includes a multiplexer 114 which is controlled by the processor 104 to switch between the video/audio signals from the tuner 32 and the VTR 86 as selected by the passenger using the touch panel 24.

Preferably, the auxiliary processor 73 is provided as an intelligent interface between the processor 104 and LAN interface unit 44. The interface unit 74 generates CGA graphics which can be applied through the multiplexer 75 for display on the screen 22. In this case, the multiplexer 75 is controlled by the processor 104 to select the output of the text generator 30 or the CGA interface 74.

While several illustrative embodiments of the invention have been shown and described, numerous variations and alternate embodiments will occur to those skilled in the art, without departing from the spirit and scope of the invention. For example, the terminals 80 with the VTRs 86 omitted may be provided for front row seats in the lower class sections rather than mounting the terminals 14 in the bulkheads. Accordingly, it is intended that the present invention not be limited solely to the specifically described illustrative embodiments. Various modifications are contemplated and can be made without departing from the spirit and scope of the invention as defined by the appended claims.

We claim:

1. An interactive video terminal, comprising:
   a video display screen;
   a transparent touch panel overlying the screen and having a plurality of pressure sensitive areas for generating discrete electrical selection signals respectively when touched;
   computing mean for generating visual prompts corresponding to predetermined selectable operations of the terminal for display on the screen underlying predetermined pressure sensitive areas of the panel respectively; and
   a movable housing for retaining the screen and panel;
   a fixed housing;
   a pivotable swing arm extending from the fixed housing for supporting the movable housing; and
   control means responsive to said selection signals from the panel for controlling the terminal to perform said operations corresponding thereto respectively, said control means comprising:
   first processor means disposed in the movable housing for sensing said selection signals generated by the panel;
   second processor means disposed in the fixed housing for controlling the terminal to perform said operations in response to said selection signals sensed by the first processor means; and
   electrical connector means extending through the swing arm and interconnecting the first and second processor means.

2. A terminal as in claim 1, in which:
   the computing means comprises means for generating said prompts in the form of a multi-level menu structure;
   the control means comprises means for controlling the terminal to perform said operations in response to a combination of a selected menu level and said selection signals respectively.

3. A terminal as in claim 1, further comprising tuner means for receiving a multiplexed video signal including a plurality of video channels and tuning to a selected channel for display on the screen, in which:
   the computing means comprises means for generating predetermined prompts corresponding to said channels for display on the screen underlying predetermined pressure sensitive areas of the panel respectively; and
   the control means comprises means for controlling the terminal to terminate display of said prompts and display said selected channel from the tuner means on the screen in response to a selection signal generated by the panel corresponding to said selected channel.

4. A terminal as in claim 3, further comprising video player means for generating video program signals corresponding to a program recorded on a video storage medium for display on the screen, in which:

the computing means further comprises means for generating predetermined prompts corresponding to selectable operations of the video player means for display on the screen underlying predetermined pressure sensitive areas of the panel respectively; and the control means controls the video player means to perform said operations in response to said selection signals corresponding thereto respectively.

5. A terminal as in claim 4, in which:

the computing means further comprises means for generating predetermined prompts corresponding to the tuner means and the video player means for display on the screen underlying predetermined pressure sensitive areas of the panel respectively; and the control means comprises means for controlling the terminal to display a selected channel from the tuner means or the program signals from the video player means in response to said selection signals corresponding thereto respectively.

6. A terminal as in claim 1, further comprising video player means for generating video program signals corresponding to a program recorded on a video storage medium for display on the screen, in which:

the computing means comprises means for generating predetermined prompts corresponding to selectable operations of the video player means for display on the screen underlying predetermined pressure sensitive areas of the panel respectively; and the control means controls the video player means to perform said operations in response to said selection signals corresponding thereto respectively.

7. A terminal as in claim 1, further comprising communication means for transmitting data signals external of the terminal, in which:

the computing means comprises:

prompt generating means for generating predetermined prompts corresponding to selectable data signals for external transmission for display on the screen underlying predetermined pressure sensitive areas of the panel; and data generating means for generating said data signals; and the control means comprises means for controlling the communication means to transmit said data signals in response to said selection signals corresponding thereto respectively.

8. A terminal as in claim 7, in which:

the prompt generating means comprises means for generating said prompts as corresponding to items which can be selectably requested; and the data generating means comprises means for generating said data signals as corresponding to said requested items.

9. A terminal as in claim 8, further comprising card reader means for reading card data from a card inserted therein for payment for said requested items, in which:

the prompt generating means comprises means for generating a prompt instructing insertion of the card into the reader means; and the communication means comprises means for transmitting said card data together with said data signals corresponding to said requested items.

10. A terminal as in claim 1, further comprising telephone transceiver means, in which:

the computing means further comprises means for generating predetermined prompts corresponding to selectable operations of the telephone transceiver means for display on the screen underlying predetermined pressure sensitive areas of the panel; and the control means comprises means for controlling the telephone transceiver means to perform said operations in response to said selection signals corresponding thereto respectively.

11. A terminal as in claim 1, in which the fixed housing is formed with a cavity, the movable housing and swing arm being movable between a viewing position external of the fixed housing and a stowed position inside the cavity of the fixed housing.

12. A terminal as in claim 1, in which the computing means comprises character generator means disposed in the fixed housing and controlled by the second processor means.

13. A terminal as in claim 1, further comprising tuner means disposed in the movable housing for receiving a multiplexed video signal including a plurality of video channels and tuning to a selected channel for display on the screen, in which:

the computing means comprises character generator means for generating predetermined prompts corresponding to said channels for display on the screen underlying predetermined pressure sensitive areas of the panel respectively; and the second processor means comprises means for controlling the terminal to terminate display of said prompts and display said selected channel from the tuner means on the screen in response to a selection signal generated by the panel corresponding to said selected channel.

14. A terminal as in claim 1, further comprising video player means disposed in the fixed housing for generating video program signals corresponding to a program recorded on a video storage medium for display on the screen, in which:

the computing means further comprises character generator means for generating predetermined prompts corresponding to selectable operations of the video player means for display on the screen underlying predetermined pressure sensitive areas of the panel respectively; and the second processor means comprises means for controlling the video player means to perform said operations in response to said selection signals corresponding thereto respectively.

15. A terminal as in claim 14, further comprising tuner means for receiving a multiplexed video signal including a plurality of video channels and tuning to a selected channel for display on the screen, which:

the character generator means further comprises means for generating predetermined prompts corresponding to the tuner means and the video player means for display on the screen underlying predetermined pressure sensitive areas of the panel respectively; and the second processor means comprises means for controlling the terminal to display a selected channel from the tuner means or the program signals from the video player means in response to said selection signals corresponding thereto respectively.

16. A terminal as in claim 1, further comprising video player means disposed in the fixed housing for generating video program signals corresponding to a program recorded on a video storage medium for display on the screen, in which:

the computing means comprises character generator means for generating predetermined prompts corresponding to selectable operations of the video player means for display on the screen underlying predetermined pressure sensitive areas of the panel respectively; and the second processor means controls the video player means to perform said operations in response to said selection signals corresponding thereto respectively.

17. A terminal as in claim 1, in which:

the computing means comprises character generator means for generating prompts corresponding to items which can be selectably requested;

the second processor means comprises means for generating data signals corresponding to said requested items;

the terminal further comprises card reader means disposed in the movable housing for reading card data from a card inserted therein for payment for said requested items;

the character generator means further comprises means for generating a prompt instructing insertion of the card into the reader means; and the first processor means comprises means for receiving said card data read from the card reader means in response to insertion of the card therein.

* * * * *